(12) United States Patent
Nakamichi

(10) Patent No.: US 9,205,732 B1
(45) Date of Patent: Dec. 8, 2015

(54) PILLAR GARNISH AND ATTACHMENT STRUCTURE THEREOF

(71) Applicant: TOKAI KOGYO CO., LTD., Obu-shi, Aichi (JP)

(72) Inventor: Koki Nakamichi, Obu (JP)

(73) Assignee: TOKAI KOGYO CO., LTD., Obu-shi (JP)

( * ) Notice: Subject to any disclaimer, the term of this patent is extended or adjusted under 35 U.S.C. 154(b) by 0 days.

(21) Appl. No.: 14/725,491

(22) Filed: May 29, 2015

(30) Foreign Application Priority Data

May 30, 2014 (JP) .................................. 2014-113182

(51) Int. Cl.
  *B60J 10/00* (2006.01)
  *B60J 10/02* (2006.01)
  *B62D 65/08* (2006.01)

(52) U.S. Cl.
  CPC .............. *B60J 10/02* (2013.01); *B60J 10/0045* (2013.01); *B60J 10/0088* (2013.01)

(58) Field of Classification Search
  CPC ..... B60J 10/02; B60J 10/0045; B60J 10/0088
  USPC ................................................... 296/93, 208
  See application file for complete search history.

(56) References Cited

U.S. PATENT DOCUMENTS

| 8,695,292 B2 * | 4/2014 | Recker ................. B60J 10/0011 296/93 |
| 2003/0218351 A1 * | 11/2003 | Kagawa ............... B60J 10/0045 296/93 |
| 2005/0189780 A1 | 9/2005 | Hara et al. |
| 2014/0306480 A1 | 10/2014 | Sasaki |

FOREIGN PATENT DOCUMENTS

| JP | 2005-206026 A | 8/2005 |
| JP | 2014-205379 A | 10/2014 |

* cited by examiner

*Primary Examiner* — Joseph D Pape
(74) *Attorney, Agent, or Firm* — Oliff PLC

(57) ABSTRACT

An elongated pillar garnish including a head portion and a leg portion protruding from a back side of the head portion and configured to abut on a front face of a window pane, wherein, when the pillar garnish is attached along a side end portion of the window pane, a concave portion is provided to a tip end of the leg portion, and the concave portion is provided along a longitudinal direction, the concave portion includes an inner wall and an exterior wall that abuts on the front face of the window pane, a drain channel is formed by the concave portion and the front face of the window pane and at least a portion of the inner wall has an opening portion that allows an inner periphery side of the window pane and the drain channel to communicate with each other.

10 Claims, 6 Drawing Sheets

PILLAR GARNISH AND ATTACHMENT STRUCTURE THEREOF

CROSS-REFERENCE TO RELATED APPLICATIONS

This application claims priority from Japanese Patent Application No. 2014-113182 filed on May 30, 2014, the entire contents of which are incorporated herein by reference.

TECHNICAL FIELD

Aspects of the present invention relate to a pillar garnish provided to a window frame of a vehicle, and an attachment structure thereof.

BACKGROUND

In windows (typically, fitting type windows) provided to vehicles, such as automobiles, generally, pillar garnishes are attached to each gap between pillars, which constitute left and right side frame portions of a window frame (window opening) of a vehicle body, and a window pane. Roughly speaking, the pillar garnishes are configured so as to integrally include an elongated head portion (main body portion) that decoratively covers the gap formed from an upper side of the window frame to a lower side thereof, a leg portion that extends from a back side of the head portion along a longitudinal direction and elastically abuts on a side end portion of the window pane of a vehicle, and a lip portion that similarly extends from the back side of the head portion along a longitudinal direction and elastically abuts on a pillar.

In such pillar garnishes, in order to favorably secure the view of the window of the vehicle during traveling in a rainy weather, it is desired to receive rainwater on the window pane at the front of the vehicle and laterally collect the rainwater with wiper blades. It is also desired that this rainwater is prevented from flowing to a window of a side surface of the vehicle body.

For example, JP-A-2005-206026 is a related-art disclosing this type of pillar garnish. A configuration in which a rainwater-receiving groove having a U-shaped cross-section is formed in a longitudinal direction by a head portion and a leg portion of a pillar garnish and a window pane and the volume of this rainwater-receiving groove is enlarged at a lower attachment portion of a pillar garnish is disclosed in JP-A-2005-206026.

Incidentally, in the attachment structure of the window of the vehicle, in order to discharge rainwater, which is collected to a lower side of the window pane via the surface of the window pane or the above rainwater-receiving groove, to the outside of the window frame, a drain hole is provided to a portion of the pillar garnish attached to a lower end portion of the window pane. Then, the rainwater or the like is introduced into the inside of the vehicle body from this drain hole, and is discharged toward the lower side of the vehicle body. However, in such a configuration in which rainwater is drained from the lower end portion of the window pane toward the lower side of the vehicle, the rainwater may move to the vicinity of the center in the width direction of the vehicle body along the lower edge of the window pane, and may drop there. Such entering of the rainwater is a situation to be avoided because there is a concern that electric or electronic components (for example, an air-conditioner) installed in the vicinity of the center of the inside of the vehicle body may be wetted, and the electric or electronic components may be damaged. Additionally, since a lower edge of the window pane is exposed through the drain hole, there is also a problem that external appearance is not preferable.

SUMMARY

Aspects of the invention solve the above problems. An object of the invention is to provide a pillar garnish and an attachment structure thereof that can prevent rainwater or the like received on a window pane from entering the vicinity of a center in a width direction inside a vehicle body, and can remedy a poor external appearance.

According to an aspect of the invention, there is provided an elongated pillar garnish attached along a side end portion of a window pane of a vehicle so as to cover a gap between the side end portion of the window pane and a pillar of the vehicle, the pillar garnish including: a head portion configured to cover the gap at an outside of the vehicle; and a leg portion protruding from a back side of the head portion and configured to abut on a front face of the window pane, wherein, when the pillar garnish is attached along the side end portion of the window pane, a concave portion is provided to a tip end of the leg portion, and the concave portion is provided along a longitudinal direction of the pillar garnish to at least a portion of the leg portion in the longitudinal direction, the concave portion includes an inner wall that abuts on the front face of the window pane at a first position and an exterior wall that abuts on the front face of the window pane at a second position, the second position being nearer to an outer periphery side of the window pane than the first position, a drain channel is formed by being surrounded by the concave portion and the front face of the window pane, and at least a portion of the inner wall has an opening portion that allows an inner periphery side of the window pane and the drain channel to communicate with each other.

According to another aspect of the invention, there is provided an attachment structure of a pillar garnish in which an elongated pillar garnish is attached along a side end portion of a window pane of a vehicle so as to cover a gap between the side end portion of the window pane and a pillar of the vehicle, wherein the pillar garnish includes a head portion and a leg portion, wherein the head portion covers the gap at an outside of the vehicle, wherein the leg portion protrudes from a back side of the head portion and abuts on a front face of the window pane, wherein a concave portion is provided to a tip end of the leg portion, and the concave portion is provided along a longitudinal direction of the pillar garnish to at least a portion of the leg portion in the longitudinal direction, the concave portion including an inner wall and an exterior wall, wherein the inner wall abuts on the front face of the window pane at a first position, wherein the exterior wall abuts on the front face of the window pane at a second position, the second position being nearer to an outer periphery side of the window pane than the first position, wherein a drain channel is formed by being surrounded by the concave portion and the front face of the window pane, and wherein at least a portion of the inner wall includes an opening portion that allows an inner periphery side of the window pane and the drain channel to communicate with each other.

According to another aspect of the invention, there is provided there is provided an elongated pillar garnish extending along a first direction, the pillar garnish including: a head portion extending in the first direction; and a leg portion extending in the first direction and attached to the head portion, wherein, in a cross-section which is perpendicular to the first direction, the head portion has a first surface and a second surface on a reverse side of the first surface, the leg portion has a third surface connected to the second surface and a fourth surface on a reverse side of the third surface, wherein the fourth surface has a recess that extends in the first direction, the recess being defined by a first wall extending in the first direction and a second wall extending in the first direction and facing the first wall, wherein the fourth surface has the recess at one end thereof in the first direction, and wherein the first wall has an opening which communicates with the recess.

DETAILED DESCRIPTION

Hereinafter, a pillar garnish and an attachment structure thereof of the invention will be described in detail based on a preferred embodiment, with reference to the drawings. Matters that are other than matters particularly mentioned in the present specification and are required for carrying out the invention can be understood as design matters for those skilled in the art based on the related art. The invention can be carried out based on matters disclosed in the present specification and drawings and technical common sense in the field concerned.

Figure 1:
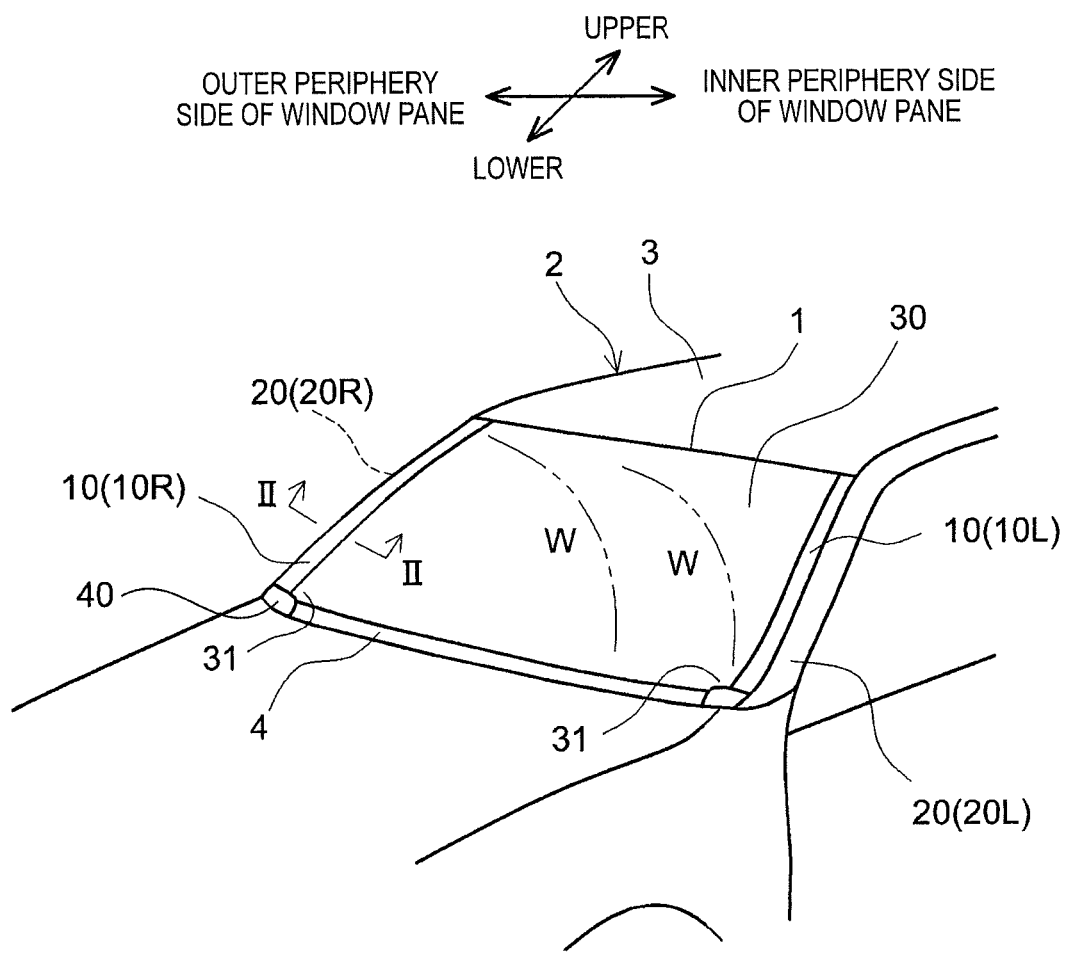
FIG. 1 is a perspective view schematically illustrating an attachment structure of a pillar garnish according to an embodiment of the invention.

FIG. 1 is a perspective view illustrating an external appearance around a front window of a vehicle (automobile) to which an elongated pillar garnish 10 according to an embodiment of the invention is attached. The front window of the vehicle is formed by a window pane 30 constituting a window body, which is fitted into a window opening 1 provided in a body panel 2 in a state where the window pane 30 is gently inclined rearward. The window opening 1 is typically configured by being surrounded by a left side pillar 20L and a right side pillar 20R that constitute left and right side frames of the vehicle, a roof panel 3, a cowl louver 4 arranged along a lower end portion 30b of the window pane 30, and the like. Here, predetermined gaps are formed between the left and right pillars 20L and 20R of the window opening 1 and the window pane 30. In order to cover the gaps, a left pillar garnish 10L to be mounted on a left side and a right pillar garnish 10R to be mounted on a right side, which are elongated in an up-down direction, are respectively attached to portions ranging from upper ends of left and right side end portions 30a of the window pane 30 to lower ends thereof.

Figure 2:
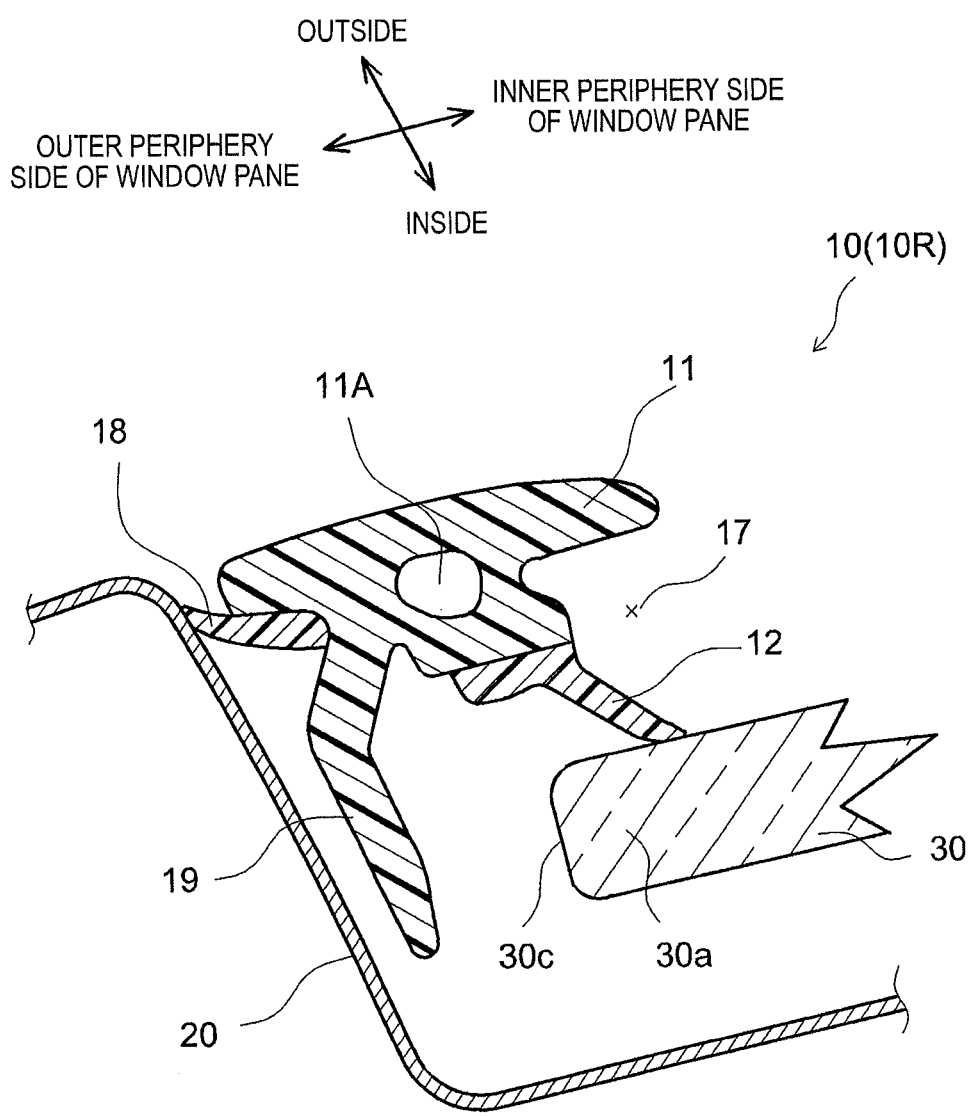
FIG. 2 is a cross-sectional view taken along line II-II in FIG. 1.
Figure 3:
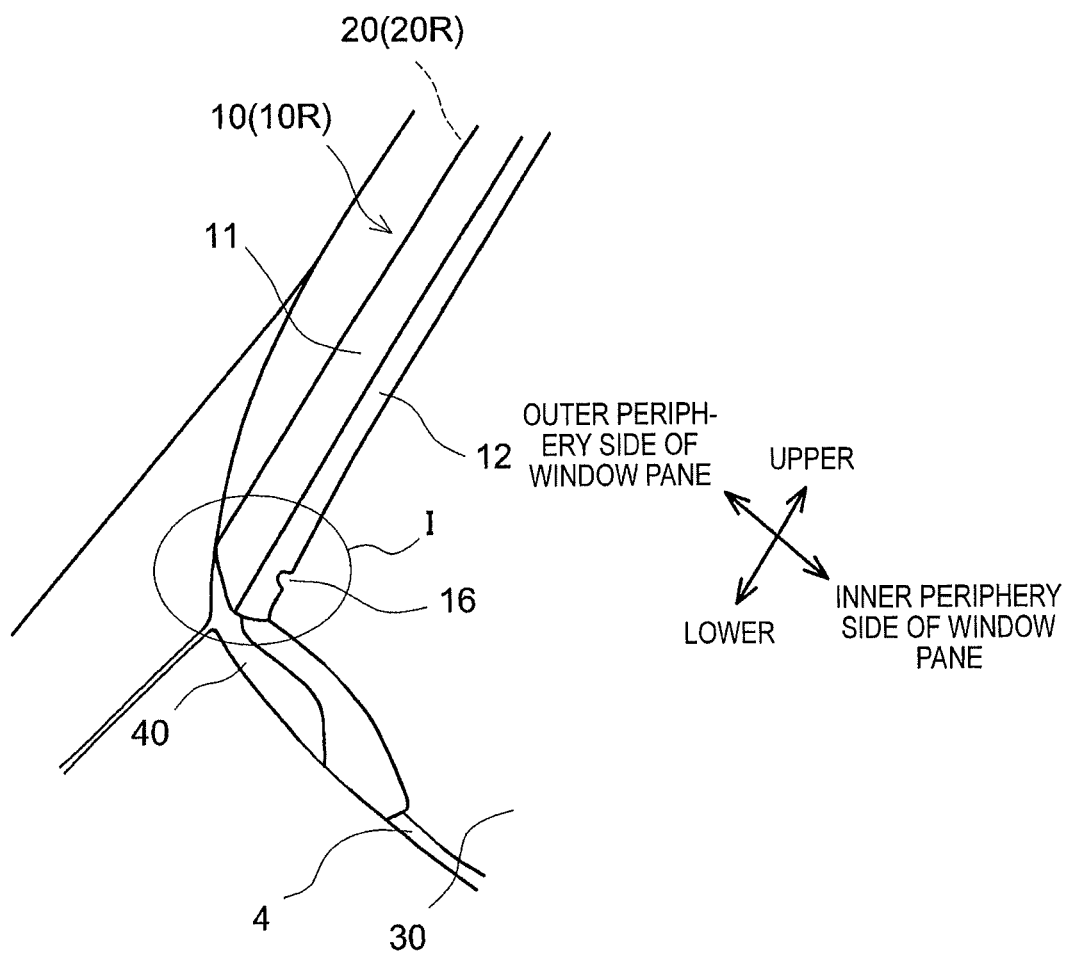
FIG. 3 is a schematic view partially illustrating a right side end portion of the window pane in FIG. 1.
Figure 4:
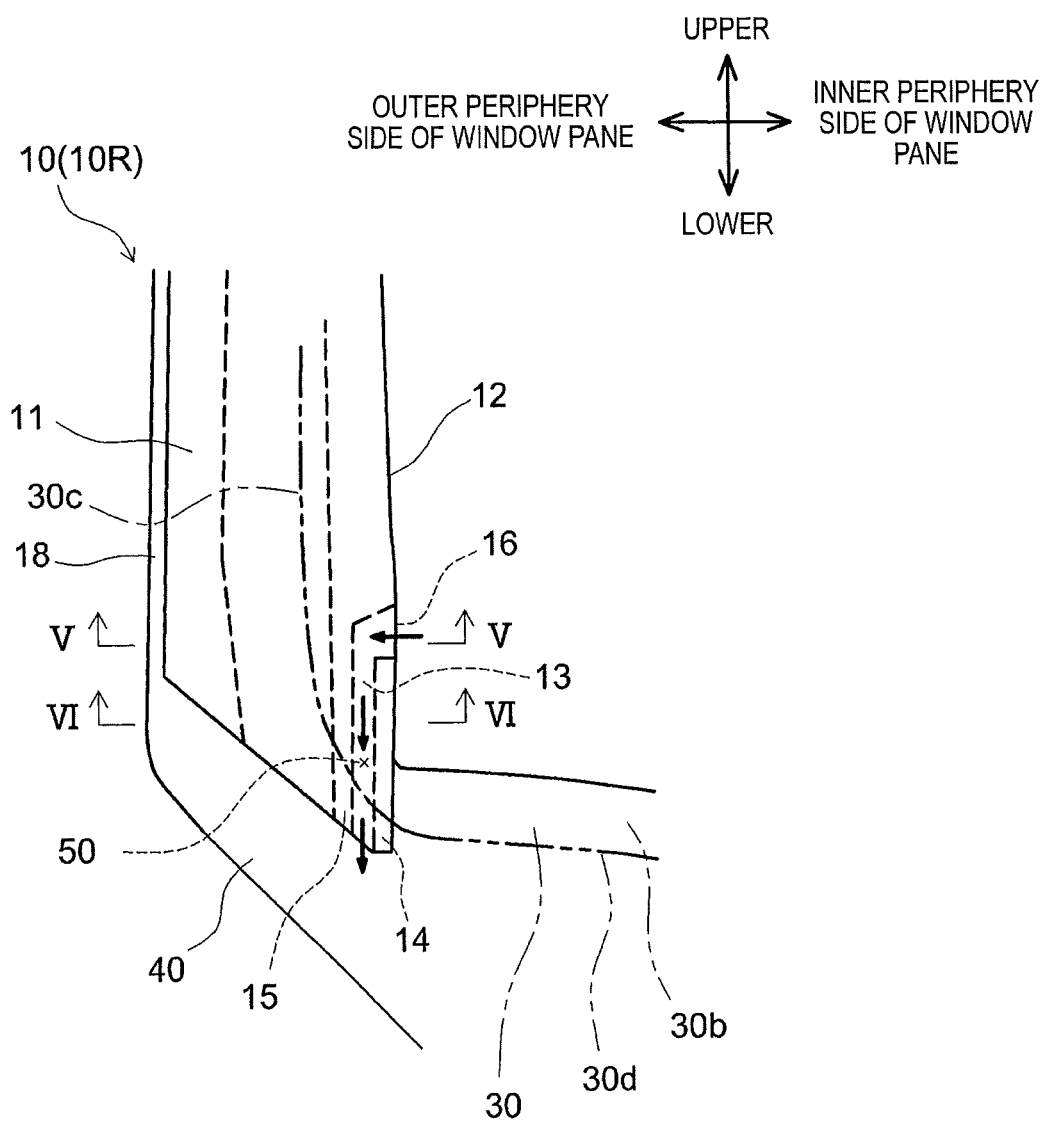
FIG. 4 is a plan view schematically illustrating the structure of the pillar garnish around portion I in FIG. 3.
Figure 5:
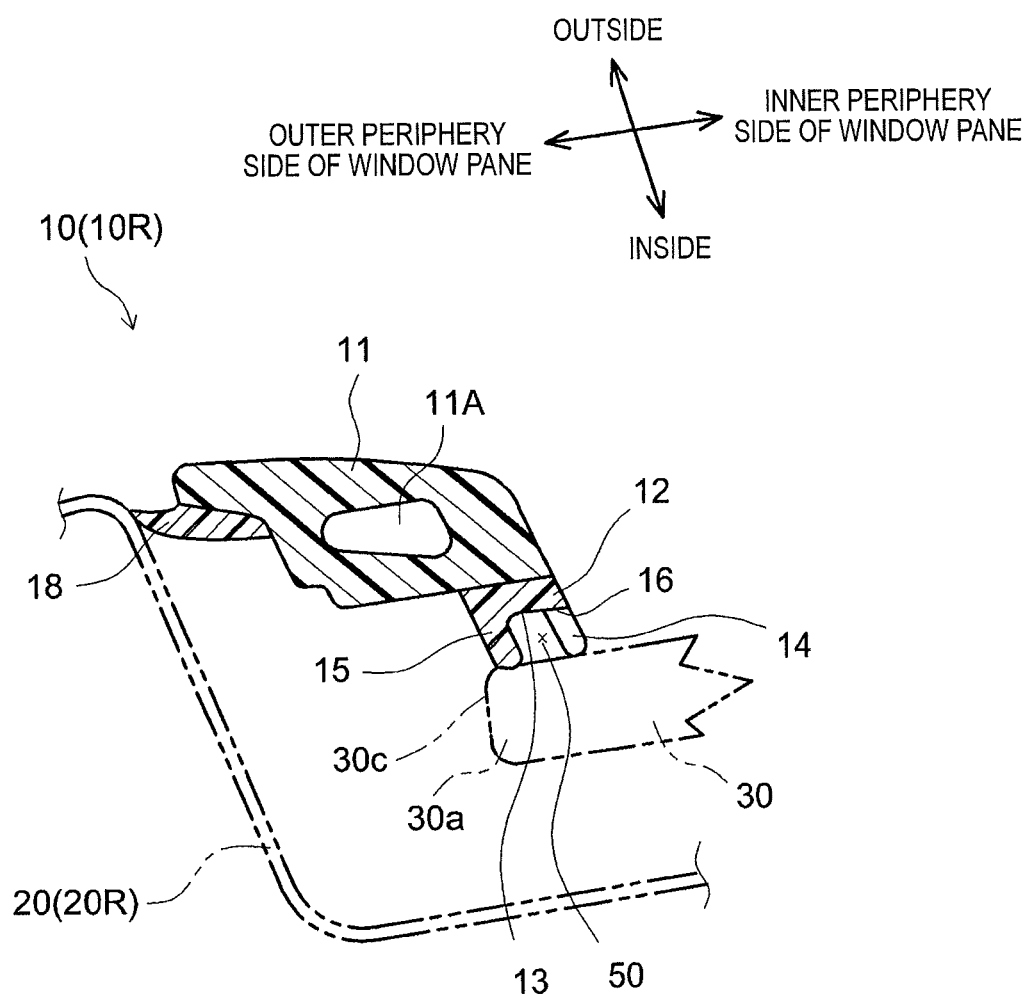
FIG. 5 is a cross-sectional view taken along line V-V in FIG. 4.

FIG. 2 is a cross-sectional view taken along line II-II in FIG. 1, and is a view illustrating the attachment state of the right pillar garnish 10R that is mounted on the side end portion 30a of the window pane 30. FIG. 3 is a perspective view schematically illustrating the attachment state of the right pillar garnish 10R in FIG. 1 to the side end portion 30a of the window pane 30. FIG. 4 is a plan view schematically illustrating the structure of the right pillar garnish 10R of a portion represented by symbol I in FIG. 3. FIG. 5 is a cross-sectional view taken along line V-V in FIG. 4, and FIG. 6 is a cross-sectional view taken along line VI-VI in FIG. 4.

As illustrated in FIG. 2, as a basic configuration, the right pillar garnish 10R (hereinafter, simply referred to as a pillar garnish 10) includes a head portion 11 and a leg portion 12. The head portion 11 is a main constituent element of the pillar garnish 10, and when the pillar garnish 10 is attached along the side end portion 30a of the window pane 30, the head portion is located at the outside of a vehicle (that is, a vehicle exterior side) of the window pane 30 and is formed so as to cover the gap between the pillar 20 and the window pane 30. The leg portion 12 is integrally formed so as to protrude from a back side of the head portion 11 to the inside of a vehicle, and a tip portion of the leg portion 12 elastically abuts on a front face of the window pane 30. In addition, the leg portion 12 protrudes from the vicinity of the center of a back face of the head portion 11 toward the front face of the window pane 30, in a cross-section orthogonal to a length direction. In this configuration, the back face of the head portion 11, a front face of the leg portion 12 on an inner periphery side of the window pane, and the front face of the window pane 30 constitute a groove portion 17. The cross-sectional shape of such a pillar garnish 10 may vary in respective regions in a longitudinal direction. For example, the cross-sectional shapes, dimensions, or the like of the head portion 11 and the leg portion 12 can be appropriately adjusted according to the shape of the pillar garnish 10 in the pillar 20, the shape of the window pane 30, or the like.

Figure 6:
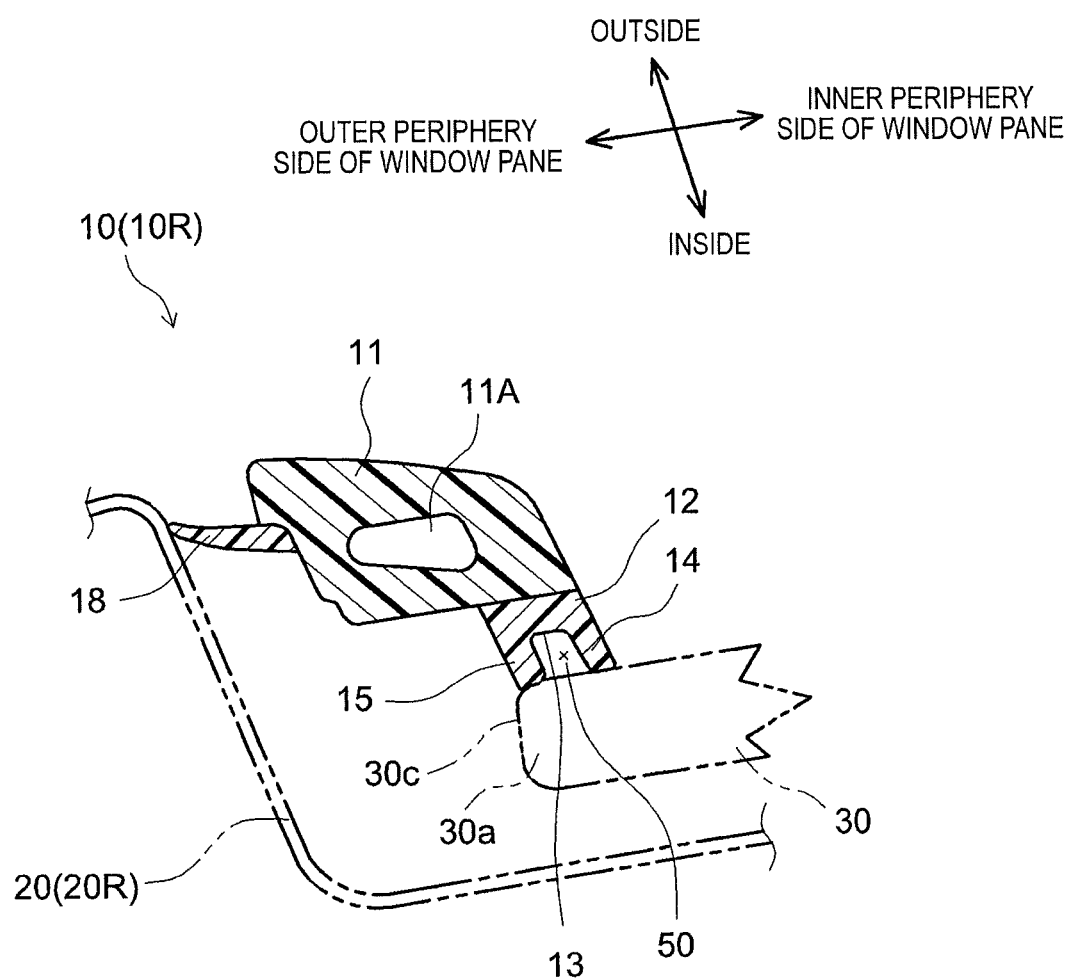
FIG. 6 is a cross-sectional view taken along line VI-VI in FIG. 4.

A concave portion 13 is provided to the tip end of the leg portion 12, and the concave portion 13 is provided along the longitudinal direction of the pillar garnish 10 to at least a portion of the leg portion 12 in the longitudinal direction (see FIGS. 4 to 6). In the present embodiment, for example, the concave portion 13 is provided in the vicinity of a lower end of the leg portion 12 in the up-down direction, in the mounting state of the pillar garnish 10 (see FIG. 4). The concave portion 13 is formed so as to have a concave shape in the cross-section of the tip end of the leg portion 12. An inner wall 14 and an exterior wall 15 of the concave portion 13 are formed at the tip end of the leg portion 12 (see FIG. 5).

The inner wall 14 elastically abuts on the front face of the window pane 30 in the mounting state of the pillar garnish 10. Additionally, the exterior wall 15 elastically abuts on the front face of the window pane 30, in a region that is located nearer to an outer periphery side of the window pane 30 than the inner wall 14 and is located nearer to the inner periphery side of the window pane than a side edge 30c of the window pane 30. A drain channel 50 is formed by a space surrounded by the concave portion 13 and the window pane 30.

In addition, the arrangement position or arrangement region of the concave portion 13 can be appropriately changed according to, for example, the shape of the window pane 30, the configuration of a wiper, or the like. For example, the concave portion 13 may be provided to a region ranging from a lower end of the leg portion 12 to the vicinity of an upper end thereof in the up-down direction, a region ranging from the lower end of the leg portion 12 to a central portion thereof, or the like, in the mounting state of the pillar garnish 10.

The inner wall 14 has an opening portion 16 that allows the inner periphery side of the window pane 30 and the drain channel 50 to communicate with each other (see FIGS. 3 to 5). The position or number of the opening portions 16 can be appropriately adjusted according to the form of the concave portion 13, or the like. For example, one opening portion 16 may be provided for one concave portion 13, or a plurality of opening portions 16 may be provided for one concave portion 13. In the present embodiment, as illustrated in FIG. 3, the inner wall 14 of one concave portion 13 is formed with one opening portion 16. As a preferable form, as illustrated in FIG. 4, the opening portion 16 can be formed so that the upside of the drain channel 50 in the longitudinal direction is closed.

The shape of such an opening portion 16 is appropriately variable. In the present embodiment, the opening portion 16 is formed in a cutout shape at a tip side of the inner wall 14, and an opening that communicates with the drain channel 50 is formed by the abutment between the inner wall 14 and the front face of the window pane 30. However, other than this form (cutout), the opening portion 16 may be provided as a through hole drilled in a circle shape or the like in a wall surface of the inner wall 14.

As illustrated in FIG. 2, the pillar garnish 10 may be provided with a lip portion 18 and a rib 19 as constituent elements other than the above head portion 11 and leg portion 12. The lip portion 18 is formed so as to protrude from the back side of the head portion 11 toward the pillar 20, and a tip portion of the lip portion 18 abuts on a front face of the pillar 20. The rib 19 is formed on the back side of the head portion 11, and is configured so as to reinforce the pillar garnish 10. Additionally, the head portion 11 that is a main constituent of the pillar garnish 10 may be a hollow structure having a hollow portion 11A along the longitudinal direction. The lip portion 18 and the rib 19 are molded integrally with the head portion 11. The lip portion 18 and the rib 19 related to the present embodiment are provided along the longitudinal direction partially in the longitudinal direction.

The pillar garnish 10 is fixed to the pillar 20 so as to cover the predetermined gap formed between the pillar 20 and the window pane 30 after the window pane 30 is mounted on the pillar 20. Although this fixing mechanism is not specifically illustrated, the pillar garnish 10 can be locked by using, for example, a well-known locking structure or the like. For example, the rib 19 of the pillar garnish 10 has engagement holes (not illustrated) at predetermined intervals along the longitudinal direction. The pillar 20 has the window pane 30 fixed thereto with an adhesive (not illustrated), and is equipped with engaging members (not illustrated), such as clips, at predetermined intervals corresponding to the engagement holes of the rib 19. The pillar garnish 10 is pushed in so as to cover the gap between the pillar 20 and the window pane 30 fixed to the pillar 20 when the pillar garnish 10 is attached. In this case, as the engagement holes of the rib 19 and the engaging members of the pillar 20 engage each other, the pillar garnish 10 can be mechanically locked to the pillar 20.

The pillar garnish 10 may have a portion (hereinafter, the portion concerned is referred to as a lower end member 40) provided to extend to the inner periphery side of the window pane 30 so as to run along a portion of the lower end portion 30b from below the side end portion 30a of the window pane 30 when being attached along the side end portion 30a of the window pane 30. Also, as illustrated in FIG. 4, the leg portion 12 formed in the longitudinal direction along the side end portion 30a of the window pane 30 is formed to a position lower than the lower end portion 30b of the window pane 30. In this case, a lower end of the concave portion 13 is formed so as to be located lower than the lower end portion 30b of the window pane 30.

The head portion 11 and the rib 19 of the above pillar garnish 10 can be suitably formed from polymer materials that are harder than the leg portion 12, the lip portion 18, and the lower end member 40. Specifically, these polymer materials include polymer materials, such as poly vinyl chloride (PVC) resin, polypropylene (PP) resin, acrylonitrile butadiene styrene (ABS) resin, acrylonitrile ethylenepropylenediene styrene (AES) resin, and polymethylmethacrylate (PMMA) resin.

Additionally, since the leg portion 12, the lip portion 18, and the lower end member 40 may be regions where resilient abutment between the pillar garnish 10 and the pillar 20 or the pillar garnish 10 and the window pane 30 is required, it is preferable to form the leg portion 12, the lip portion 18, and the lower end member 40 by using polymer materials that are relatively softer than the polymer materials that constitute the head portion 11 and the rib 19. Specifically, these polymer materials include various kinds of thermoplastic resins and thermoplastic elastomers, such as olefin-based resin and elastomer, styrene-based resin and elastomer, ester-based resin and elastomer, polyamide-based resin and elastomer, chloride-vinyl-based resin and elastomer, and urethane-based resin and elastomer, and various kinds of rubber, such as crude rubber, and ethylene propylene diene (EPDM) rubber.

In addition, in order to strengthen the joining between these regions (between the head portion 11 and the rib 19, and the leg portions 12, the lip portions 18 or the lower end member 40), it is preferable that these regions are formed from materials that are compatible with each other. For example, when the head portion 11 and the rib 19 are formed from polymer materials, such as AES resin, it is preferable to form the leg portion 12 and the lip portion 18 from polymer materials, such as a styrene-based thermoplastic elastomer (TPS).

Since all of the above respective materials can be softened and show flowability if heat is applied thereto, the pillar garnish 10 can be simply manufactured in arbitrary shapes using various kinds of well-known molding methods. For example, due to differences between the above materials, the pillar garnish 10 can be manufactured by stepwisely integrally molding or separately manufacturing and integrally joining (1) the head portion 11 and the rib 19 and (2) the leg portion 12, the lip portion 18, and the like.

(1) In order to form the head portion 11 and the rib 19, it is preferable to use, for example, a gas assist injection molding method, although the method is not limited thereto. That is, first, an injection molding mold having a cross-sectional shape corresponding to the head portion 11 and the rib 19 is prepared. Then, a polymer material (for example, AES resin) is injected into this mold to fill the mold, and gas (for example, nitrogen gas) is injected into the mold. Accordingly, an integrally-molded article of the head portion 11 and a rib 19, which has a desired cross-sectional shape and is elongated, can be obtained as an intermediate article. In this case, the head portion 11 can be formed in a substantially tubular shape having a hollow portion (gas channel) 11A through introduction of the gas.

(2) In order to form the leg portion 12, the lip portion 18, and the like, it is preferable to use, for example, an injection molding method, although the method is not limited thereto. That is, first, an injection molding mold having shapes corresponding to respective regions, such as the leg portion 12 and the lip portion 18, is prepared. Then, the intermediate article (the head portion 11 and the rib 19) manufactured in advance is set in this mold. Next, a polymer material (for example, TPO resin) is injected and filled into the mold in which the intermediate article is set. Thus, the leg portion 12, the lip portion 18, and the like having desired cross-sectional shapes are formed to and simultaneously welded to and integrated with the head portion 11 and the rib 19. Accordingly, the pillar garnish 10 can be manufactured.

In addition, the leg portion 12, the lip portion 18, and the like can be integrated by separately manufacturing these regions, for example, by using an injection molding method, and joining these regions to the intermediate article (the head portion 11 and the rib 19), which has been manufactured in advance, together with an adhesive or the like.

Additionally, the leg portion 12, the lip portion 18, and the like may be integrated with the intermediate article by welding and integrating some of these portions with respect to the intermediate article through injection molding and by separately forming the other portions to join and integrate the other portions with an adhesive or the like. For example, when the pillar garnish 10 having the lower end member 40 is manufactured, the intermediate article (the head portion 11 and the rib 19) and the lower end member 40 may be prepared in advance as separate members. Also, the leg portion 12 and the lip portion 18 may be welded to and integrated with this intermediate article through injection molding, and the lower end member 40 may be joined to the intermediate article with an adhesive or the like.

Next, the functions of the pillar garnish 10 related to the present embodiment and the operation and effects in the attachment structure of the pillar garnish 10 will be described in detail with reference to FIGS. 1 and 4.

In the attachment structure of the pillar garnish 10 disclosed herein, the pillar garnish 10 is mounted so as to cover the gap between the pillar 20 and the window pane 30 from the outside of the vehicle. Therefore, this gap is not exposed, and the external appearance can be kept favorably. Additionally, the leg portion 12 of the pillar garnish 10 abuts on the front face of the window pane 30. This can prevent rainwater received in the window pane 30 from entering the gap between the pillar 20 and the window pane 30.

Moreover, the groove portion 17 is formed in the up-down direction along the side end portion 30a of the window pane 30 between the pillar garnish 10 and the window pane 30 (see FIG. 2). The groove portion 17 can receive rainwater collected by a wiper blade (not illustrated) to the side by the front face of the window pane 30, and makes this rainwater flow downward from the window pane 30, thereby restraining the rainwater from flowing into a side surface of the vehicle body.

Also, in the attachment structure of the pillar garnish 10 disclosed herein, the rainwater collected in the groove portion 17 reaches the opening portion 16 when the rainwater flows downward within the groove portion 17. Then, this rainwater flows into the drain channel 50 through the opening portion 16, as indicated by an arrow in FIG. 4. Since the drain channel 50 is surrounded in all directions by the concave portion 13 and the front face of the window pane 30, the rainwater introduced into the drain channel 50 is not scattered to the surrounding areas.

Additionally, the exterior wall 15 abuts on the front face of the window pane 30 nearer to the inner periphery side of the window pane 30 than the side edge 30c of the window pane 30 (see FIG. 5). Therefore, the side edge 30c of the window pane 30 can be prevented from being seen through the opening portion 16 when the pillar garnish 10 is seen from the outside of the vehicle, particularly from the inner periphery side of the window pane 30. Accordingly, the attachment structure of the pillar garnish 10 having a favorable external appearance can be realized.

Rainwater collected to the side end portion 30a of the window pane 30 can preferably be collected to a corner 31 of the window pane 30 along the groove portion 17 (see FIG. 1). Therefore, by providing the opening portion 16 at a position corresponding to a corner 31 ranging from the side end portion 30a of the window pane 30 to the lower end portion 30b, the rainwater or the like can be efficiently introduced into the drain channel 50, and can be drained more effectively.

Additionally, the lower end of the concave portion 13 is configured so as to be located lower than the lower end portion 30b of the window pane 30 (see FIG. 4). Therefore, even after the rainwater introduced into the drain channel 50 has passed through the drain channel 50, the rainwater is discharged from lower than the lower end portion 30b of the window pane 30 along the concave portion 13. Accordingly, after the rainwater received at the window pane 30 has been introduced to the interior of the vehicle through the drain channel 50, the rainwater can be discharged toward a lower side of the vehicle lower than the side end portion 30a of the window pane 30. In other words, rainwater or the like can be discharged toward the lower side of the vehicle by preventing the rainwater from entering the vicinity of the center of the inside of the vehicle body in the width direction along the lower edge 30d of the window pane 30.

In addition, in a form in which the opening portion 16 is formed upper than the position corresponding to the corner 31 of the window pane 30, rainwater that flows upward in the groove portion 17 of the window pane 30 during traveling of the vehicle can be preferably introduced into the drain channel 50 through the opening portion 16. Additionally, in a form in which a plurality of the opening portions 16 are formed, water flowing at an upper side and the lower side of the side end portion 30a of the window pane 30 can be rapidly introduced into the drain channel 50. Moreover, in a form in which an upper side of the drain channel 50 is closed, the water flowing through the drain channel 50 can be prevented from flowing out upward. The rainwater received in the window pane 30 can be more efficiently drained to the lower side of the vehicle body according to the installation form of such an opening portion 16.

Although the specific example of the invention has been described above in detail by referring to the drawings, these are merely illustrative and do not intend to limit the claims. Various modifications and alternations of the specific example illustrated above are included in techniques set forth in the claims of the invention. For example, in the above-described example, the concave portions or the like are respectively provided to a right pillar garnish mounted on the right side of the front window of the vehicle and to a left pillar garnish mounted on the left side of the front window of the vehicle. However, the concave portion may be provided to either of the left or right pillar garnishes.

In the attachment structure of the pillar garnish related to another embodiment, the pillar garnishes can be respectively attached to the left and right side end portions 30a of the window pane 30. In such embodiment, as for the opening portion 16 of the left pillar garnish 10L attached to the side end portion 30a on the left side of the window pane 30 and the opening portion 16 of the right pillar garnish 10R attached to the side end portion 30a on the right side of the window pane 30, the numbers of the opening portions or the positions of the opening portions in the up-down direction can be made different from each other. That is, wipers installed on the front window of the vehicle, as illustrated by dotted lines W of FIG. 1, slide in a left-right direction along the front face of the window pane 30, thereby wiping and collecting rainwater at the left and right side end portions of the window pane 30. However, the amounts of the collected rainwater or the positions thereof in the up-down direction are different at the right side end portion and the left side end portion of the window pane. Therefore, when the left and right pillar garnishes 10L and 10R are attached to the window pane 30, the numbers of the opening portions 16 and the positions thereof in the up-down direction can be adjusted so as to correspond to the amounts or positions of the rainwater that is respectively collected at the right side end portion and the left side end portion of the window pane 30. Accordingly, it is preferable in that the rainwater can be more efficiently introduced into the drain channel 50.

The invention provides illustrative, non-limiting aspects as follows (1) In a first aspect, there is provided an elongated pillar garnish attached along a side end portion of a window pane of a vehicle so as to cover a gap between the side end portion of the window pane and a pillar of the vehicle, the pillar garnish including: a head portion configured to cover the gap at an outside of the vehicle; and a leg portion protruding from a back side of the head portion and configured to abut on a front face of the window pane, wherein, when the pillar garnish is attached along the side end portion of the window pane, a concave portion is provided to a tip end of the leg portion, and the concave portion is provided along a longitudinal direction of the pillar garnish to at least a portion of the leg portion in the longitudinal direction, the concave portion includes an inner wall that abuts on the front face of the window pane at a first position and an exterior wall that abuts on the front face of the window pane at a second position, the second position being nearer to an outer periphery side of the window pane than the first position, a drain channel is formed by being surrounded by the concave portion and the front face of the window pane, and at least a portion of the inner wall has an opening portion that allows an inner periphery side of the window pane and the drain channel to communicate with each other.

Accordingly, the rainwater or the like received on the window pane is discharged from the opening portion of the inner wall of the pillar garnish attached along the side end portion of the window pane through the drain channel toward the lower side of the vehicle body. Accordingly, rainwater or the like can be prevented from dropping in the vicinity of the center of the inside of the vehicle body along the lower edge of the window pane. Additionally, since the drain channel is surrounded by the concave portion and the window pane, rainwater or the like introduced into the drain channel can be prevented from being scattered to the surrounding areas. Moreover, since the exterior wall is provided between the inner wall, to which the opening portion is provided, and a side edge of the window pane, it is possible to prevent a situation where the side edge of the window pane is exposed from the opening portion and appearance deteriorates.

(2) In a second aspect, there is provided the pillar garnish according to the first aspect, wherein, when the pillar garnish is attached along the side end portion of the window pane, the opening portion is formed at a position corresponding to a corner ranging from the side end portion of the window pane to a lower end portion of the window pane.

Accordingly, the opening portion is provided at the corner. Therefore, in addition to the effects of the first aspect, there is obtained an effect that rainwater collected at a lower side of the side end portion of the window pane can be more effectively drained through the drain channel.

(3) In a third aspect, there is provided the pillar garnish according to the first or second aspect, wherein, when the pillar garnish is attached along the side end portion of the window pane, the opening portion is formed above a position corresponding to a corner ranging from the side end portion of the window pane to a lower end portion of the window pane.

Accordingly, in addition to the effects of the first or second aspect, there are obtained effects that water flowing at an upper side of the side end portion of the window pane during traveling of the vehicle can be preferably drained through the opening portion and rainwater or the like can be suppressed from flowing to the roof side of the vehicle body.

(4) In a fourth aspect, there is provided the pillar garnish according to any one of the first to third aspects, wherein the inner wall includes a plurality of the opening portions.

Accordingly, in addition to the effects of the first to third aspects, there is obtained an effect that water flowing at an upper side or a lower side of the side end portion of the window pane can be more effectively drained to the lower side of the vehicle body.

(5) In a fifth aspect, there is provided the pillar garnish according to any one of the first to fourth aspects, wherein, when the pillar garnish is attached along the side end portion of the window pane, the drain channel is closed at an upper side thereof in the longitudinal direction.

Accordingly, in addition to the effects of the first to fourth aspects, there are obtained effects that water flowing through the drain channel can be prevented from flowing out upward in the drain channel, and the water can be more effectively drained toward the lower side of the vehicle body.

(6) In a sixth aspect, there is provided the pillar garnish according to any one of the first to fifth aspects, wherein the pillar garnish is a front pillar garnish that is attached so as to cover the gap between a front pillar and the window pane at the front of the vehicle.

Accordingly, since the front pillar garnish is mounted on the front of the vehicle, a large amount of rainwater is received on the window pane during forward traveling of the vehicle. Therefore, according to this configuration, since the effects of the first to fifth aspects are more clearly exhibited, it is preferable.

(7) In a seventh aspect, there is provided an attachment structure of a pillar garnish in which an elongated pillar garnish is attached along a side end portion of a window pane of a vehicle so as to cover a gap between the side end portion of the window pane and a pillar of the vehicle, wherein the pillar garnish includes a head portion and a leg portion, wherein the head portion covers the gap at an outside of the vehicle, wherein the leg portion protrudes from a back side of the head portion and abuts on a front face of the window pane, wherein a concave portion is provided to a tip end of the leg portion, and the concave portion is provided along a longitudinal direction of the pillar garnish to at least a portion of the leg portion in the longitudinal direction, the concave portion including an inner wall and an exterior wall, wherein the inner wall abuts on the front face of the window pane at a first position, wherein the exterior wall abuts on the front face of the window pane at a second position, the second position being nearer to an outer periphery side of the window pane than the first position, wherein a drain channel is formed by being surrounded by the concave portion and the front face of the window pane, and wherein at least a portion of the inner wall includes an opening portion that allows an inner periphery side of the window pane and the drain channel to communicate with each other.

Accordingly, the rainwater or the like received on the window pane is discharged from the opening portion of the inner wall of a pillar garnish attached along the side end portion of the window pane through the drain channel toward the lower side of the vehicle body. Accordingly, rainwater or the like can be prevented from dropping in the vicinity of the center of the inside of the vehicle body along the lower edge of the window pane. Additionally, since the drain channel is surrounded by the concave portion and the window pane, water or the like introduced into the drain channel can be prevented from being scattered to the surrounding areas. Moreover, since the exterior wall is provided between the inner wall, to which the opening portion is provided, and the side edge of the window pane, it is possible to prevent a situation where the side edge of the window pane is exposed from the opening portion and appearance deteriorates.

(8) In an eighth aspect, there is provided the attachment structure according to the seventh aspect, wherein the pillar garnish is continuously arranged along at least from the side end portion of the window pane to a portion of a lower end portion of the window pane, and wherein a lower end of the concave portion is located below the lower end portion of the window pane.

Accordingly, in addition to the effects of the seventh aspect, there are obtained effects that rainwater introduced into the drain channel can be effectively discharged toward the lower side of the vehicle body and rain water or the like can be prevented from dropping in the vicinity of the center of the inside of the vehicle body via the lower edge of the window pane.

(9) In a ninth aspect, there is provided the attachment structure according to the seventh or eighth aspect, wherein pillar garnishes are respectively attached to left and right side end portions of the window pane, and wherein a position of the opening portion of the pillar garnish attached to the left side end portion of the window pane and a position of the opening portion of the pillar garnish attached to the right side end portion of the window pane are different from each other in the longitudinal direction.

At the left side end portion and the right side end portion of the window pane, the amounts or positions of rainwater or the like may vary depending on the configuration of the wipers. Therefore, in addition to the effects of the seventh or eighth aspect, the opening portion can be provided at a suitable position according to the configuration of wipers provided to the vehicle or the like. Accordingly, there is obtained an effect that rainwater or the like can be efficiently introduced into the drain channel and discharged toward the lower side of the vehicle body.

(10) In a tenth aspect, there is provided an elongated pillar garnish extending along a first direction, the pillar garnish including: a head portion extending in the first direction; and a leg portion extending in the first direction and attached to the head portion, wherein, in a cross-section which is perpendicular to the first direction, the head portion has a first surface and a second surface on a reverse side of the first surface, the leg portion has a third surface connected to the second surface and a fourth surface on a reverse side of the third surface, wherein the fourth surface has a recess that extends in the first direction, the recess being defined by a first wall extending in the first direction and a second wall extending in the first direction and facing the first wall, wherein the fourth surface has the recess at one end thereof in the first direction, and wherein the first wall has an opening which communicates with the recess.

What is claimed is:

1. An elongated pillar garnish attached along a side end portion of a window pane of a vehicle so as to cover a gap between the side end portion of the window pane and a pillar of the vehicle, the pillar garnish comprising:
    a head portion configured to cover the gap at an outside of the vehicle; and
    a leg portion protruding from a back side of the head portion and configured to abut on a front face of the window pane,
    wherein, when the pillar garnish is attached along the side end portion of the window pane,
        a concave portion is provided to a tip end of the leg portion, and the concave portion is provided along a longitudinal direction of the pillar garnish to at least a portion of the leg portion in the longitudinal direction,
        the concave portion includes an inner wall that abuts on the front face of the window pane at a first position and an exterior wall that abuts on the front face of the window pane at a second position, the second position being nearer to an outer periphery side of the window pane than the first position,
        a drain channel is formed by being surrounded by the concave portion and the front face of the window pane, and
        at least a portion of the inner wall has an opening portion that allows an inner periphery side of the window pane and the drain channel to communicate with each other.

2. The pillar garnish according to claim 1,
    wherein, when the pillar garnish is attached along the side end portion of the window pane, the opening portion is formed at a position corresponding to a corner ranging from the side end portion of the window pane to a lower end portion of the window pane.

3. The pillar garnish according to claim 1,
    wherein, when the pillar garnish is attached along the side end portion of the window pane, the opening portion is formed above a position corresponding to a corner ranging from the side end portion of the window pane to a lower end portion of the window pane.

4. The pillar garnish according to claim 1,
    wherein the inner wall includes a plurality of the opening portions.

5. The pillar garnish according to claim 1,
    wherein, when the pillar garnish is attached along the side end portion of the window pane, the drain channel is closed at an upper side thereof in the longitudinal direction.

6. The pillar garnish according to claim 1,
    wherein the pillar garnish is a front pillar garnish that is attached so as to cover the gap between a front pillar and the window pane at the front of the vehicle.

7. An attachment structure of a pillar garnish in which an elongated pillar garnish is attached along a side end portion of a window pane of a vehicle so as to cover a gap between the side end portion of the window pane and a pillar of the vehicle,
    wherein the pillar garnish includes a head portion and a leg portion,
    wherein the head portion covers the gap at an outside of the vehicle,
    wherein the leg portion protrudes from a back side of the head portion and abuts on a front face of the window pane,
    wherein a concave portion is provided to a tip end of the leg portion, and the concave portion is provided along a longitudinal direction of the pillar garnish to at least a portion of the leg portion in the longitudinal direction, the concave portion including an inner wall and an exterior wall,
    wherein the inner wall abuts on the front face of the window pane at a first position,
    wherein the exterior wall abuts on the front face of the window pane at a second position, the second position being nearer to an outer periphery side of the window pane than the first position,
    wherein a drain channel is formed by being surrounded by the concave portion and the front face of the window pane, and wherein at least a portion of the inner wall includes an opening portion that allows an inner periphery side of the window pane and the drain channel to communicate with each other.

8. The attachment structure according to claim 7, wherein the pillar garnish is continuously arranged along at least from the side end portion of the window pane to a portion of a lower end portion of the window pane, and wherein a lower end of the concave portion is located below the lower end portion of the window pane.

9. The attachment structure according to claim 7, wherein pillar garnishes are respectively attached to left and right side end portions of the window pane, and wherein a position of the opening portion of the pillar garnish attached to the left side end portion of the window pane and a position of the opening portion of the pillar garnish attached to the right side end portion of the window pane are different from each other in the longitudinal direction.

10. An elongated pillar garnish extending along a first direction, the pillar garnish comprising:

a head portion extending in the first direction; and
a leg portion extending in the first direction and attached to the head portion,
wherein, in a cross-section which is perpendicular to the first direction,
 the head portion has a first surface and a second surface on a reverse side of the first surface,
 the leg portion has a third surface connected to the second surface and a fourth surface on a reverse side of the third surface,
wherein the fourth surface has a recess that extends in the first direction, the recess being defined by a first wall extending in the first direction and a second wall extending in the first direction and facing the first wall,
wherein the fourth surface has the recess at one end thereof in the first direction, and
wherein the first wall has an opening which communicates with the recess.

\* \* \* \* \*